(12) United States Patent
Yang

(10) Patent No.: US 6,778,723 B1
(45) Date of Patent: Aug. 17, 2004

(54) INTEGRATED OPTICAL SWITCH

(75) Inventor: Liyou Yang, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 246 days.

(21) Appl. No.: 09/973,431

(22) Filed: Oct. 9, 2001

Related U.S. Application Data

(60) Provisional application No. 60/246,959, filed on Nov. 9, 2000.

(51) Int. Cl.[7] .................................................. G02B 6/26
(52) U.S. Cl. .............................. 385/16; 385/14; 385/15
(58) Field of Search ................................ 385/14, 15–18

(56) References Cited

U.S. PATENT DOCUMENTS

| | | |
|---|---|---|
| 4,390,236 A | 6/1983 | Alferness |
| 4,533,207 A | 8/1985 | Alferness |
| 4,693,547 A | 9/1987 | Soref et al. |
| 4,703,996 A * | 11/1987 | Glass et al. ................... 385/14 |
| 4,728,167 A | 3/1988 | Soref et al. |
| 5,004,447 A | 4/1991 | Soref |
| 5,016,958 A | 5/1991 | Booth |
| 5,224,185 A | 6/1993 | Ito et al. |
| 5,253,314 A | 10/1993 | Alferness et al. |
| 5,329,601 A | 7/1994 | Nakamura |
| 5,331,452 A | 7/1994 | Smyth et al. |
| 5,377,284 A | 12/1994 | Bülow |
| 5,473,712 A | 12/1995 | Blow et al. |
| 5,502,781 A | 3/1996 | Li et al. |
| 5,627,925 A | 5/1997 | Alferness et al. |
| 5,682,455 A | 10/1997 | Kovacic et al. |
| 5,699,462 A | 12/1997 | Fouquet et al. |
| 5,832,155 A | 11/1998 | Rasch et al. |
| 6,157,638 A | 12/2000 | Tayloe et al. |
| 6,163,039 A | 12/2000 | Guo |
| 6,163,055 A | 12/2000 | Hirakata et al. |
| 6,167,168 A | 12/2000 | Dieckroeger et al. |
| 6,167,170 A | 12/2000 | Boffi et al. |

* cited by examiner

*Primary Examiner*—Fayez Assaf
(74) *Attorney, Agent, or Firm*—William J. Burke, Esq.

(57) ABSTRACT

The present invention is an integrated optical switch, comprising a switching element and an optical detector in communication with the switching element. The integrated optical switch includes an optical detector of amorphous semiconductor material on a semiconductor waveguide. Optical header information is detected and interpreted, and the switch is operated according to the header information.

17 Claims, 2 Drawing Sheets

_US 6,778,723 B1_

INTEGRATED OPTICAL SWITCH

CROSS-REFERENCE TO RELATED APPLICATIONS

This application is related to, and claims priority from, U.S. Provisional Applications No. 60/246,959, entitled Ultrafast Integrated Optical Switch filed on Nov. 9, 2000.

FIELD OF THE INVENTION

The present invention relates to an optical switching device. More particularly, the present invention relates to an optical switching device that comprises a switching element integrated with an optical detector and the method for making such device.

BACKGROUND OF THE INVENTION

An optical switch switches light energy from one optical path to another. U.S. Pat. No. 4,728,167 to Soref et al. that issued on Mar. 1, 1988 is directed to an electrically controlled integrated optical switch. The body of the switch is made of crystalline silicon and has an X-shaped channel waveguide structure forming an intersection crossover region. The index of refraction of the intersection crossover region is altered by changing the current or voltage supplied to the electrodes located at the intersection crossover region. This changes the amount of optical cross coupling of light between the intersecting waveguides. Crystalline semiconductor waveguide optical switches having at least one optical waveguide formed within a core layer made of a crystalline semiconductor are known. The waveguide absorbs controlling light when an electric field is applied, and a pair of electrodes are formed for applying a voltage to a waveguide part to manipulate the index of refraction.

The limitations of known optical switches, however, do not adequately satisfy the demands of optical telecommunications. In telecommunications applications, switching takes place in the electrical domain rather than in the optical domain, because sufficiently fast and cost-effective optical switches are unavailable. A smart, fast, integrated, cost effective optical switch is needed to meet the demands of high performance optical networks and access networks, including a switch enabling packet switching in the optical domain.

SUMMARY OF THE INVENTION

An optical switch according to the principles of the invention is an integrated optical switch including a switching element and an optical detector in communication with the switching element. The optical detector processes header information from an optical packet to operate the switch and route the payload. A single switch element can be made from two planar waveguides. By adjusting a voltage applied to one waveguide relative to the other, a phase shift between the waveguide modes can be controlled by refractive index change induced by charge injection. Multiple switch elements can be combined to form a switch fabric, such as an N×N fabric.

The optical detector can be a PIN diode built on top of the input waveguide to the switch and comprising semiconductor material having a higher index of refraction than the waveguide material. Light leaking into the diode is converted to an electrical signal which can be processed to extract the header information and control the switch. In an exemplary embodiment, the input waveguide comprises aSi:H and the PIN diode comprises a-Ge. The waveguide is built on a c-Si substrate. Integrated logic circuitry responsive to the electrical signal provided by the PIN diode can be fabricated on the c-Si substrate, and operates to interpret the address information from the optical header. A voltage applied across the waveguides changes the appropriate index of refraction to cause switching the light energy from one waveguide to the other via induced charge injection. A second PIN diode in the waveguide creates the induced charge injection. The resulting detector and switch element provides sufficiently fast switching to route packets in the optical domain.

BRIEF DESCRIPTION OF THE FIGURES

A more complete understanding of the present invention may be obtained from consideration of the following description in conjunction with the drawings in which.

DETAILED DESCRIPTION OF THE INVENTION

An integrated optical switch according to the principles of the invention comprises a switching element and an optical detector in communication with the switching element. The switching element is operable to direct light, such as an optical packet, to a channel or branch in an optical circuit. The switching element operates by a change in the relative index of refraction of two semiconductor waveguides. The change in the index of refraction is induced by charge injection. The voltage that is applied to induce charge injection should be appropriate to change the refractive index such that the optical packet is directed into the selected waveguide. The optical detector is capable of reading an optical packet that contains address information in the header.

Figure 1:
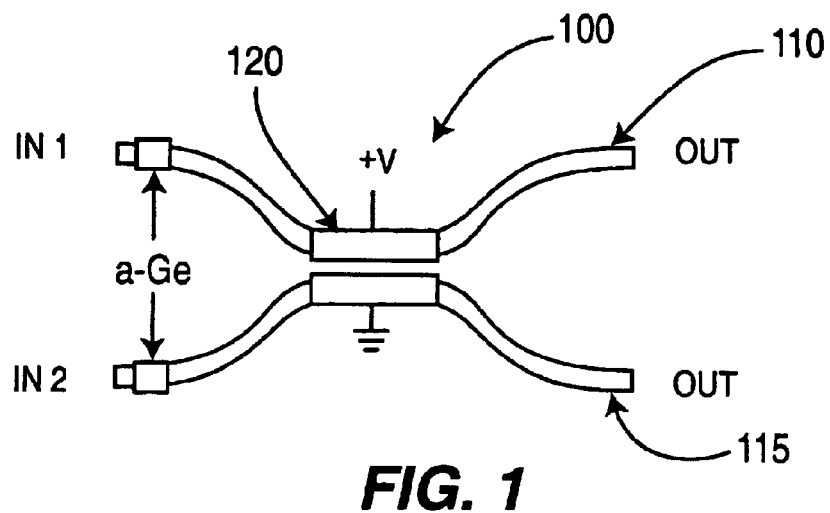
FIG. 1 is a schematic of an optical switch according to the principles of the invention.

In FIG. 1 a schematic of an integrated optical switch 100 according to the principles of the invention is shown. A switching element 120 has a directional coupler that is formed by planar waveguides 110, 115, which have sections positioned in close proximity. A voltage 122 differential induces a relative change in the index of refraction between the waveguides 110, 115 which results in a phase shift. The change in the index of refraction is induced by charge injection. Typically, about 10 volts or more is needed to induce a change in the index of refraction that is sufficient to switch about 100% of the light from one waveguide 110 to the other waveguide 115 in about 1 to 10 ns. The change in the index of refraction directs the optical information passing through to the desired channel or branch. The integrated optical switch 100 may be combined with other similar switches to form an N×N switch fabric. Optical header processors 112 and 114 interpret the header information of an optical packet and control the switch 100 via the voltage 122.

The switch element 120 of the optical switch 100 can comprise semiconductor materials, such as c-Si or a-Si. The optical detectors and processors 112 and 114 can comprise amorphous semiconductor material, such as amorphous Germanium (a-Ge), silicon germanium alloys or other semiconductor material having suitable bandgap, and can be a PIN diode in communication with circuitry to process optical header information. The material a-Ge has a direct bandgap of about 1 eV and an absorption coefficient in the range of about 100 to 500 cm−1 at a wavelength of about 1550 nm. In one exemplary embodiment, the optical detector is a PIN diode comprising a-Ge and the waveguides comprise a-Si. Because the index of refraction of a-Ge is greater than that of a-Si, a portion of the optical packet or guided wave in the a-Si waveguide leaks into the monolithically integrated a-Ge opticalidetector. The detector converts the signal to an electrical signal, which is used to process address information.

The a-Si waveguide at the directional coupler switch also has a PIN diode structure. Forward biasing the PIN diode causes charge injection in the a-Si, thereby inducing the change in index of refraction. The change in the index of refraction causes a relative phase shift which causes a change in the switching state.

Figure 2:
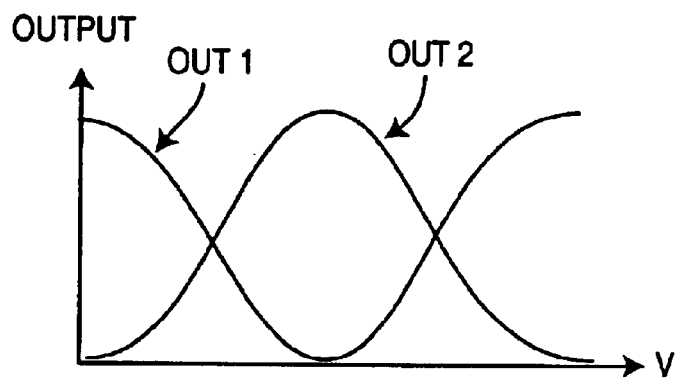
FIG. 2 is a graphical representation of output signals as a function of voltage on a directional coupler according to the principles of the invention.

FIG. 2 provides a graphical representation 200 of the switching state versus voltage applied to the switching element of FIG. 1. The x-axis represents the voltage differential value and the y-axis represents the output of the switch. Two curves are plotted: OUT 1 and OUT 2, which correspond to the outputs at the OUT 1 port and OUT 2 port of the switch of FIG. 1, respectively. At V=0 volts, OUT 1 is high and OUT 2 is low. This means that all the light energy is directed to the OUT 1 port. At V=10 volts, all energy is directed to the OUT 2 port. The time to switch from OUT 1 to OUT 2 can be approximately 1 to 10 ns.

Figure 3:
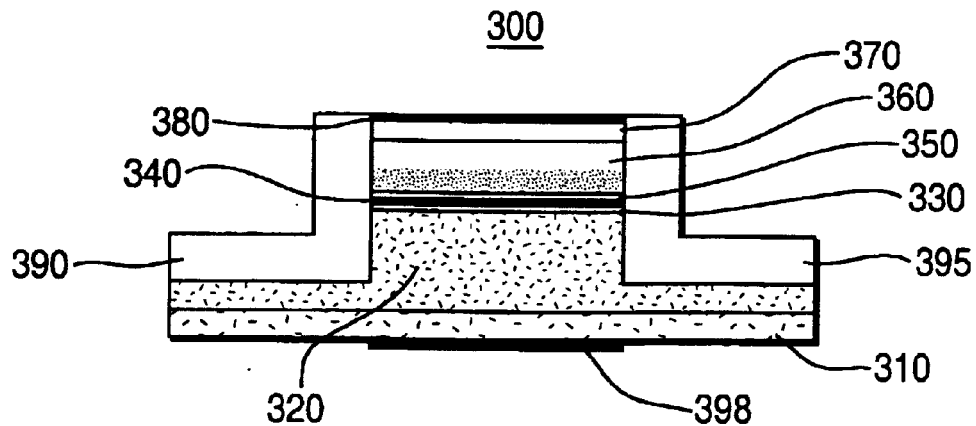
FIG. 3 is a cross sectional view depicting a switch element according to the principles of the invention.

FIG. 3 illustrates a cross section 300 of a detector and switch element according to the principles of the invention, which includes an a-Ge pin photodiode on an a-Si waveguide. The structure includes an a-Si:H layer 320 of about 0.5 to 1.0 μm thick on a substrate 310, such as a polished n-type crystalline silicon substrate or a polished fused quartz substrate. Deposited on top of this layer 320 is a p-type a-Si:H layer 330 of about 10 nm to 20 nm thick. An Al electrode 340 is deposited on the p-type a-Si:H layer 330 in defined areas with a thickness from about 0.1 μm to 0.2 μm. Another p-type a-Si:H layer 350, about 10 nm to 20 nm thick, is deposited over the p-type a-Si:H layer 330 and Al electrode 340. An a-Ge intrinsic layer 360 is deposited on top of the p-type layer 350. The thickness of the a-Ge layer 360 is in the range of about 0.3 μm to 1.0 μm. The next layer 370 is a-Si:H n-type layer 370 at a thickness of about 10 nm to 20 nm. Another Al top electrode 380 about 0.2 μm thick is deposited over the detector areas and the directional coupler areas. The cladding layers 390 and 395 can be SiOx, SiNx or SiCx. On the back side of the silicon wafer at the bottom of layer 310 is deposited an Alback electrode 398 for the directional couplers.

The a-Si:H layer 320 can be deposited on the polished n-type crystalline silicon substrate 310 using a plasma enhanced chemical vapor deposition (PECVD) method. The feedstock used for the deposition can be SiH4 that is preferably diluted in H2. The deposition temperature is typically in the range from about 200° to 250° C. and the pressure is in the range from about 0.5 to 2 torr. Both RF and DC plasma can be used for the deposition. The plasma power is typically in the range from about 20 to 150 mW/cm2. The p-type a-Si:H layer 330 can be fabricated by mixing about 1% B2H6 with SiH4. The deposition conditions and parameters are essentially the same as above.

The Al electrode 340 is deposited in these defined areas with thickness from about 0.1 μm to 0.2 μm and the remaining photoresist is cleaned off. The a-Ge pin diode detector areas are also defined by photolithography.

The p-type a-Si:H layer 350 can be deposited using the same process as the PECVD method described above. The a-Ge intrinsic layer 360 can be deposited using PECVD of GeH4 diluted in H2. The H2/GeH4 ratio is in the range of about 10:1 to 50:1, the deposition temperature is between 150° to 250° C., and the pressure is in the range of about 0.5 to 2 torr. Both RP and DC plasma can be used for the deposition and the plasma power is typically in the range of about 20 to 150 mW/cm2. The a-Si:H n-type layer 370 can be deposited using the same PECVD process as for the ptype layer 300, except substituting B2H6 with PH3 as the dopant. Any remaining photoresist is cleaned off prior to reapplying photoresist to define areas of the a-Ge photodiodes and the directional coupler sections of the waveguides, using photolithography for the electrode 380. The electrode 380 can be deposited over the detector areas and the directional coupler areas by sputtering or evaporation.

After depositing the electrode 380, the remaining photoresist is again cleaned off. Waveguide patterns forming a switch fabric can be defined using photolithography, and the waveguide ridges by dry etching. Contact areas (both top and bottom contacts for the photodiodes and a fraction of the electrode areas at the directional couplers) are defined with photoresist. The cladding layers 390, 395 are deposited using the PECVD technique. For SiOx, the feedstock can be a mixture of SiH4 and N2O. For SiNx, the feedstock can be a mixture of SiH4 and NH3. For SiCx, the feedstock can be a mixture of SiH4 and CH4. The deposition temperature is in the range from 150° to 250° C.

Figure 4:
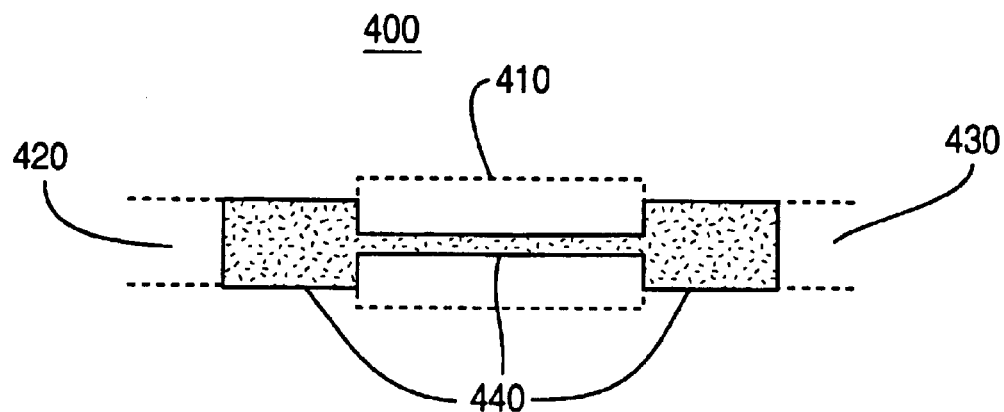
FIG. 4 is a bottom view of an electrode patten of one embodiment of a switch element according to the principles of the invention.

In FIG. 4, electrode pattern 400 for the a-Ge pin detectors is depicted for one embodiment according to the principles of the invention. Electrode patterns for the a-Ge pin optical detectors 410 are defined by photolithography. The width of waveguides 420, 430 are a few micrometers and the length of the a-Ge optical detector 410 is in the range between about 40 μm and 200 μm. The width of the electrode channel 440 across the optical detector 410 area to collect photocurrent from an optical signal would be on the order of 1 μm.

An exemplary method for making an integrated optical switch comprises the steps of: (a) providing a polished n-type crystalline silicon substrate; (b) depositing intrinsic amorphous silicon on the polished n-type crystalline silicon substrate; (c) depositing p-type hydrogenated amorphous silicon on the intrinsic amorphous silicon; (d) defining bottom electrode patterns on the polished n-type crystalline silicon substrate; (e) depositing aluminum electrodes on the ptype hydrogenated amorphous silicon; (f) defining amorphous germanium pin detector areas on the p-type hydrogenated amorphous silicon; (g) depositing type hydrogenated amorphous silicon on said I)type hydrogenated amorphous silicon of step (f); (h)depositing an amorphous germanium intrinsic layer on the p-type hydrogenated amorphous silicon of step (g); (i) depositing n-type hydrogenated amorphous silicon on the amorphous germanium intrinsic layer, (j) cleaning off remaining photoresist; (k) applying a second photoresist; (l) defining amorphous germanium photodiodes areas and directional coupler areas; (m) depositing aluminum top of the electrodes; (n) cleaning remaining photoresist; (o) defining waveguide patterns; (p) dry etching waveguide ridges; (q) defining contact areas; (r) depositing a cladding layer; and (s) depositing an aluminum backing contact on said polished n-type crystalline silicon substrate.

Figure 5:
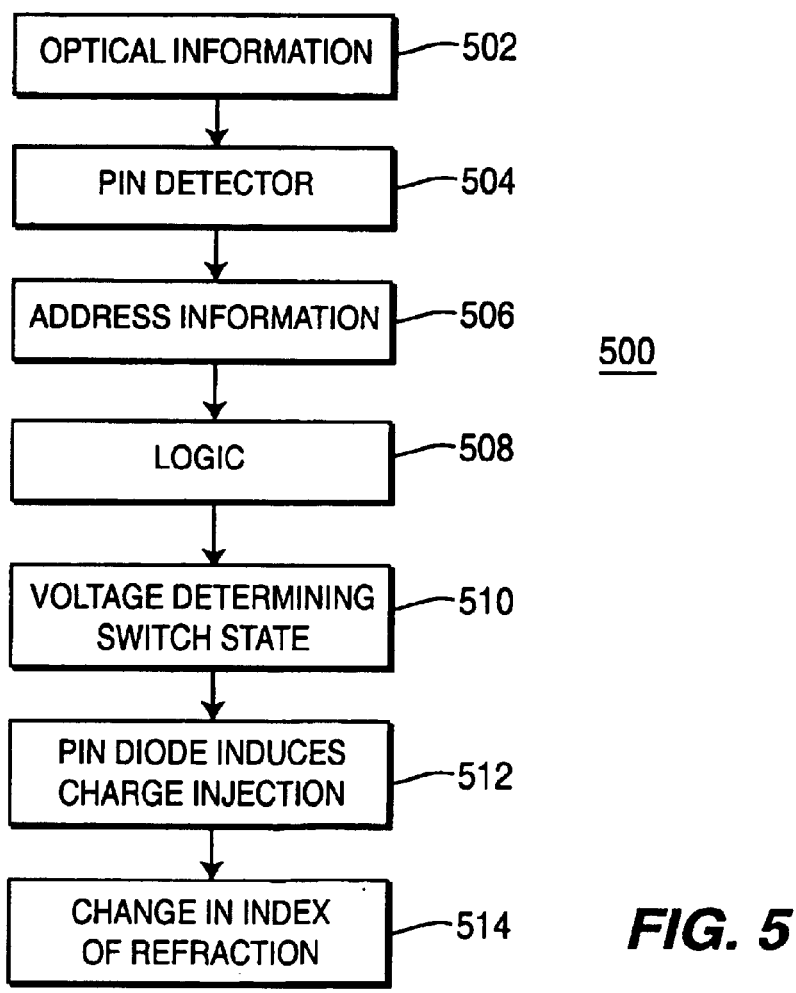
FIG. 5 is an exemplary process flow for switching according to the principles of the invention.

FIG. 5 illustrates a process flow 500 for the operation of an integrated optical switch according to the principles of the invention. Such a switch can be represented by the schematic 100 of FIG. 1, and includes detectors and waveguides for directing the optical information. Optical information 502, such as an optical packet, is processed by a PIN detector 504. The optical information has address information 506 which, when processed by the switch, causes the switch to direct the payload to the destination address. The address information 506 detected by the PIN detector 504 is processed in logic circuits 508 which provide a switch state determinative voltage 510. Another PIN diode 512 induces a charge injection according to the switch state. The charge injection causes a corresponding change in the index of refraction of the waveguides thereby determining the optical path for the optical information.

Having now fully described this invention, it will be appreciated by those skilled in the art that the same can be performed within equivalent parameters and conditions without departing from the principle of the invention. This application is intended to cover any variations, uses, or adaptations of the inventions following, in general, the principles of the invention and including such departures from the present disclosure as come within known or customary practice within the art to which the invention pertains.

What is claimed is:

1. An integrated optical switch, comprising:

an optical directional coupler including a first semiconductor waveguide and a second semiconductor waveguide, wherein selected voltage differentials across the first and second waveguides correspond to selected switch states; and an optical detector comprising amorphous semiconductor material integral to the optical directional coupler and operable to select at least one of the voltage differentials;

wherein the optical detector reads an optical packet header and the optical packet header is used for controlling the selected switch states.

2. The switch of claim 1 wherein the optical directional coupler and integrated detector comprises amorphous semiconductor materials.

3. The switch of claim 2 wherein the amorphous semiconductor materials are selected from amorphous germanium alloys and amorphous silicon alloys.

4. The switch of claim 1 wherein the voltage differentials cause a charge injection induced change in index of refraction.

5. The switch of claim 1 further comprising a means to apply the selected voltage differentials.

6. The switch of claim 1 wherein the optical detector includes a PIN diode.

7. The switch of claim 1 wherein the optical detector includes an intrinsic layer having amorphous germanium.

8. An integrated optical switch comprising:

a substrate;

a semiconductor waveguide on the substrate;

a first PIN diode responsive to optical signals on the waveguide, the PIN diode including a semiconductor material having an index of refraction greater than an index of refraction of the waveguide and operable to provide electrical signals; and logic circuitry for determining address information from the electrical signals;

a second PIN diode responsive to a biasing voltage, the biasing voltage corresponding to the address information, wherein the second PIN diode causes a charge injection induced change in an index of refraction of the semiconductor waveguide.

9. The optical switch of claim 8 wherein the substrate is selected from a material comprising Si and a material comprising quartz.

10. The optical switch of claim 8 wherein the semiconductor waveguide comprises a-Si.

11. The optical switch of claim 8 wherein the first PIN diode semiconductor material comprises an amorphous semiconductor.

12. The optical switch of claim 8 wherein the first PIN diode semiconductor material comprises a-Ge.

13. The optical switch of claim 8 wherein an application of a voltage differential to the semiconductor waveguide results in a change in an index of refraction for the semiconductor waveguide due to charge injection.

14. The optical switch of claim 13 wherein the semiconductor waveguide comprises an amorphous semiconductor material, the charge injection being at least in the amorphous semiconductor material.

15. An optical switch comprising:

a substrate;

an a-Si:H layer on the substrate;

a first p-type a-Si:H layer on the a-Si:H layer;

a first electrode deposited in a defined area on the first p-type a-Si:H layer;

a second p-type a-Si:H layer on the first ptype a-Si:H layer and the electrode;

an a-Ge intrinsic layer on the second p-type a-Si:H layer;

an a-Si:H n-type layer on the a-Ge intrinsic layer;

a second electrode deposited on the a-SirH n-type layer; and a bottom electrode on the substrate substantially opposite the a-Si:H layer.

16. In an integrated optoelectronic device, a method for switching optical packets in the optical domain:

converting optical header information to electrical signals using a first PIN diode comprising amorphous semiconductor material on an amorphous semiconductor waveguide;

interpreting an address for the optical packets from the electrical signals;

biasing a second PIN diode according to the address; and charge injecting the semiconductor waveguide according to the biasing.

17. The method of claim 16 wherein the charge injecting step includes the step of providing a voltage differential across the waveguide.

* * * * *